June 8, 1926.
J. DEARMANN
1,588,015
OIL LEVEL INDICATOR
Filed Sept. 26, 1925
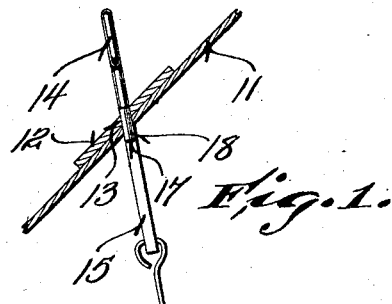
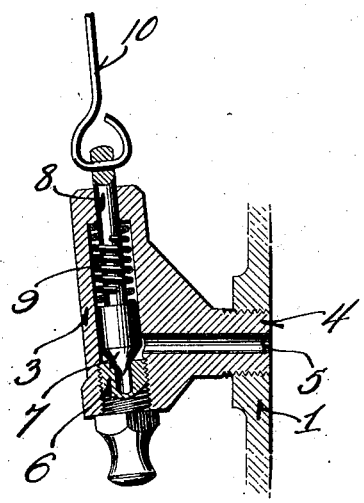
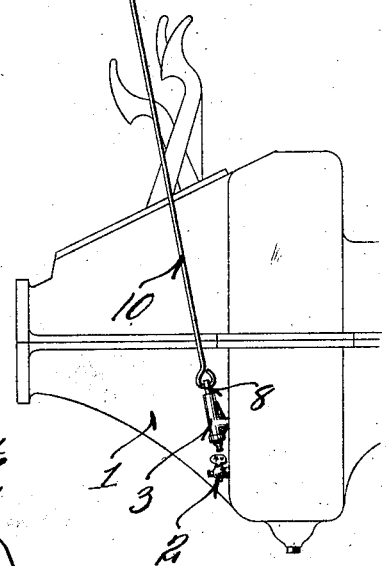
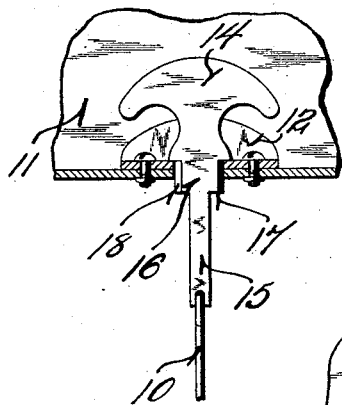
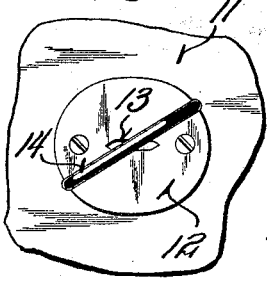
Inventor
James Dearmann

Patented June 8, 1926.

UNITED STATES PATENT OFFICE.

JAMES DEARMANN, OF MILWAUKEE, WISCONSIN, ASSIGNOR TO N. A. BOEHM, OF MILWAUKEE, WISCONSIN.

OIL-LEVEL INDICATOR.

Application filed September 26, 1925. Serial No. 58,801.

This invention relates to oil level indicators, and is particularly directed to an indicator adapted for use upon automobiles.

In automobile construction, it is the usual practice to put one or more pet cocks on the transmission case to indicate the oil level. However, these pet cocks are difficult of access and a long handled wrench is ordinarily employed to permit the driver to reach down under the car and turn on the pet cock to be tested. Further than this, unless the wrench is tapped against the pet cock after the pet cock has been closed, leaking will occur with a gradual loss of oil from the transmission case.

This invention is designed to overcome the above noted defects, and objects of such invention are to provide an oil level indicator which may be manipulated from the dash or other accessible portion of the automobile, and which is so constructed that it may be temporarily locked in open position.

Further objects are to provide an oil level indicator in which the pet cock or valve is spring closed and held in a tight condition by means of a spring to thus prevent any loss of oil whatsoever under ordinary conditions.

Further objects are to provide a device which may be very cheaply constructed, and which is extremely simple and may be readily manipulated by an unskilled operator.

An embodiment of the invention is shown in the accompanying drawings, in which:—

Figure 1 is a diagrammatic view showing a portion of the transmission case of a conventional automobile and a portion of the dash with the device in place.

Figure 2 is an enlarged sectional view through the pet cock.

Figure 3 is a view partly in section illustrating the manually manipulated member.

Figure 4 is a plan view of the structure shown in Figure 3 with the member retracted and temporarily locked.

The transmission case 1 is ordinarily provided with a lower pet cock 2 and with an upper pet cock. In the practice of this invention, the upper pet cock is removed and replaced by a special pet cock 3. This member 3, as shown in detail in Figure 2, is provided with a threaded extension 4 adapted to be screwed into the transmission case 1. An oil passage 5 leads through the extension 4 and into the hollow body portion of the member. This hollow body portion receives the valve seat 6 which is provided with a conical upper face closed by the conical portion 7 of a reciprocatory plunger 8. It is to be noted that a spring 9 is positioned within the member 3 and urges the plunger downwardly into valve closing position.

The upper end of the plunger 8 is apertured and receives the eye of a connecting rod or other suitable form of connector 10. It is, of course, to be understood that other means may replace the rigid rod 10. For example, a flexible member may be employed if desired.

The dash 11 is provided with a plate 12 equipped with a slot 13, as shown most clearly in Figures 1, 3 and 4. This plate is secured to the dash in any suitable manner and a manually manipulable member 14 has a portion thereof extending through the slot 13. This member is made with a relatively long small tongue 15 apertured to receive the upper eye of the rod or connector 10, as shown in Figure 3. It is provided above the tongue 15 with a wider shank 16 having bottom shoulders 17 and preferably beveled faces 18 at its ends.

Under normal conditions, the manually manipulable member 14 remains in the position shown in Figure 3. However when it is desired to test the oil level, it is merely necessary for the operator to draw the member 14 upwardly to thus open the valve or pet cock. When the member is retracted, it is given a partial turn, as indicated in Figure 4. This causes the shoulders 17 to rest upon the plate 12 and thus temporarily retain the member in retracted or elevated position. The driver is then at liberty to release the member and look under the car to see if oil is being discharged from the special pet cock. These pet cocks are, of course, relatively small and a very minute quantity of oil passes therethrough in the short period of time required for investigation. Having ascertained the condition of the oil level, the driver merely turns the member 14 into its normal position, as shown in Figure 3, and allows the member to snap back into its normal position, thus permitting closing of the pet cock.

It will be seen that this invention fulfills a long felt want in the automobile industry as it permits testing of the oil without requiring the driver to reach under the car.

Further than this, the apparatus possesses the very desirable characteristic of maintaining the pet cock closed by spring pressure under all conditions and thus prevents loss of oil through inadvertent opening due to jarring or through inattention with reference to hammering the pet cock tight after it has been closed as in the usual practice.

It will be seen further that the device may be very cheaply manufactured and is of extremely simple construction.

Further than this, it is to be noted that the device does not interfere with any of the usual parts of the automobile.

Although the invention has been described in considerable detail, it is to be understood that the invention may be variously embodied and is, therefore, to be limited only as claimed.

I claim:—

1. In an automobile having a dash and a transmission casing provided with a threaded aperture, a fitting screwed into said threaded aperture, and having a recessed body portion provided with a shoulder at the upper end of such recess, a plug screwed in the lower end of said recess and provided with an aperture therethrough and with a valve seat, a plunger valve normally seated on said valve seat and having an upwardly extending rod passing through said body portion, a spring interposed between said valve and said shoulder, means extending upwardly from said rod and passing through said dash, and a holding member carried by the upper end of said means and adapted to hold said valve in raised position against the action of the spring or to allow said spring to seat said valve.

2. In an automobile having a body portion provided with a dash and with a transmission casing, a valve carried by said transmission casing and normally spring closed, an elongated member extending upwardly from said valve to a point below said dash, a plate secured to said dash and having an elongated slot therein, and a manipulating member having a shouldered shank corresponding in contour to said slot and adapted to pass through said slot and attached to said elongated member, said manipulating member being adapted for upward motion and for partial rotary motion, whereby said member may be partially withdrawn from said slot and rotated transversely thereof to lock said valve temporarily in open position.

In testimony that I claim the foregoing I have hereunto set my hand at Milwaukee, in the county of Milwaukee and State of Wisconsin.

JAMES DEARMANN.